June 19, 1951      F. V. FORSS      2,557,087

DRINK MIXER SUPPORT

Filed April 23, 1948

Inventor
Fritz Victor Forss
By Ira Milton Jones
Attorney

Patented June 19, 1951

2,557,087

UNITED STATES PATENT OFFICE 2,557,087

DRINK MIXER SUPPORT

Fritz Victor Forss, Racine, Wis., assignor to John Oster Manufacturing Company, Racine, Wis., a corporation of Wisconsin Application April 23, 1948, Serial No. 22,890

2 Claims. (Cl. 248—346)

This invention relates to electric drink mixers and refers more particularly to mixers of the type wherein the agitator is rotatably journalled in the bottom wall of the mixer cup.

In mixers of this type the mixer cup has a side wall which tapers to a minimum diameter at its bottom, and the agitator carried by the cup is adapted to be automatically coupled with a driver on the motor shaft upon insertion of the bottom portion of the cup into a ring-like cup holder mounted on the motor housing at its top and encircling the driver. This cup holder has a bore tapered to correspond to the taper on the side wall of the cup so as to hold the cup upright and in axial alignment with the driver on the motor shaft.

In the past, drink mixers of the type herein concerned have been provided with a ring-like cup holder made of metal, and which consequently was influenced by the heat of the mixer motor as well as by the temperature of the cup and its contents. Hence, the ring was caused to expand by the heat of the motor at times when the cup was removed. If the cold cup was then reinserted in its holder, it caused shrinking or contraction of the ring into tightly gripping engagement with the exterior of the cup. When such contraction of the holder occurred, removal of the mixer cup was extremely difficult.

In attempts to overcome this difficulty, holders made of rubber or an equivalent yieldable material have been substituted for the metal holders, but this expedient was also found undesirable because the yieldability of such holders permitted the mixer cup to drift out of alignment with the driver on the motor shaft.

With these objections in mind it is an object of the present invention to provide a drink mixer of the character described wherein the mixer cup is at all times easily removable from its holder and wherein the cup is held in true axial alignment during mixing.

More specifically it is an object of this invention to provide a drink mixer wherein the mixer cup has only limited engagement with its holder so as to assure easy removability of the cup under all conditions of mixing.

Still another object of this invention resides in the provision of an improved holder for drink mixers of the character described wherein intimate contact between it and the cup held thereby is limited to relatively small surface areas circumferentially spaced a substantial distance from one another.

With the above and other objects in view, which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawing illustrates one complete example of the physical embodiment of the invention constructed according to the best mode so far devised for the practical application of the principles thereof, and in which.

Figure 1:
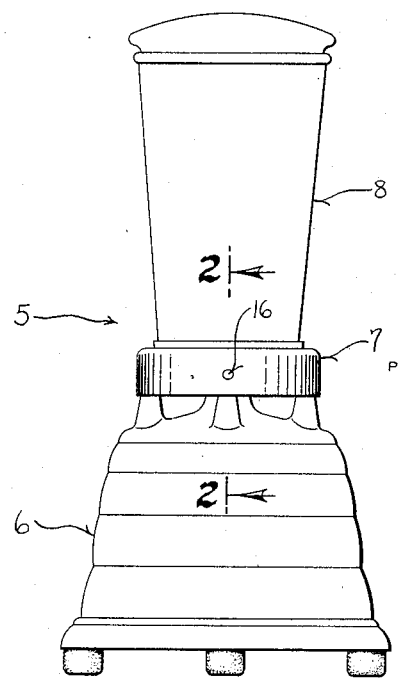
Figure 1 is a side elevational view of an electric drink mixer of the type to which this invention pertains.

Referring now more particularly to the accompanying drawing, the numeral 5 generally designates a drink mixer of the type having a base 6 which serves to house an electric motor (not shown). A rigid metallic supporting ring or holder 7 is fixed to the base in spaced relationship to the top thereof, and is adapted to receive and support the mixing cup 8 in a predetermined upright position co-axially with the driver 9 on the motor shaft. The driver projects up through the top of the motor housing or base 6 into the central portion of the holder 7.

In the type of electric drink mixer described, the agitator 10 is freely rotatably journalled in the bottom wall 11 of the mixer cup, and has a socket 12 by which it is drivingly coupled with the driver 9 upon insertion of the bottom portion of the cup into the holder 7.

As is customary, the side wall of the cup is tapered to a minimum diameter at the bottom of the cup, and the holder 7 has a bore 14 extending therethrough provided with a taper corresponding to that on the side wall of the cup and of a size to receive only the bottom portion of the cup. The matching tapers on the cup wall and the holder 7 desirably assure co-axiality between the driving socket in the cup and the driver 9.

As long as the ring or holder 7 is made of metal, it absorbs some of the heat of the motor during periods of non-use of the mixer. In mixers where the holder and cup have intimate contact throughout the entire circumference of the cup, the metal holder quickly became cooled during the mixing of cold drinks in the cup. This resulted in contraction of the holder a degree sufficient to cause freezing of the cup in its holder by the shrinking of the holder onto the exterior of the cup. Obviously whenever such freezing occurred it was extremely difficult to remove the cup from its holder after proper mixing of a cold drink in the cup.

Figure 3:
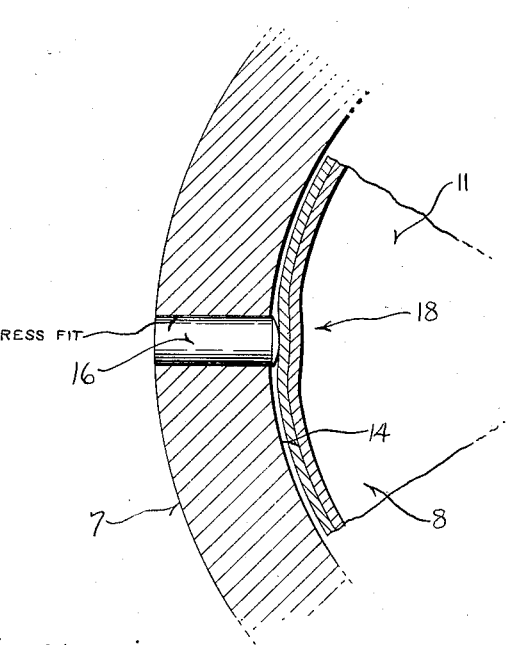
Figure 3 is an enlarged sectional view taken through Figure 2 along the plane of the line 3—3.
Figure 2:
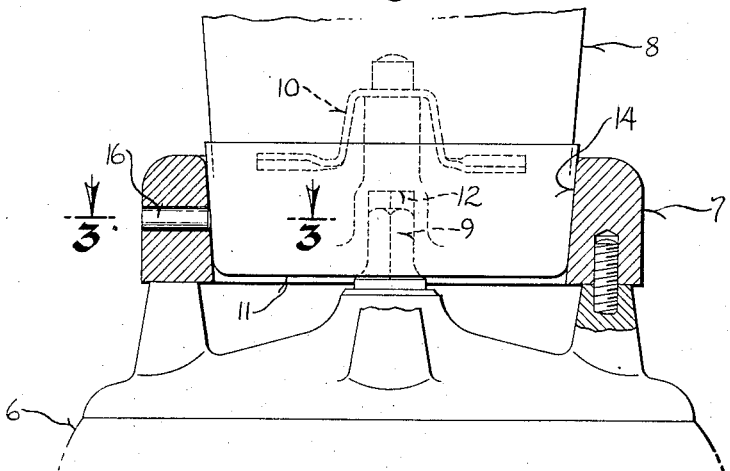
Figure 2 is an enlarged view of part of the mixer shown in Figure 1 with portions of the mixer cup and its holder shown in cross section to illustrate the means for assuring ready removability of the mixer cup under all conditions of use.

With the present invention, however, the cup is at all times freely removable from its holder 7, and to assure this result, a non-yielding protuberance or pin 16 is fixedly embedded in the side wall of the holder with its inner end projecting into the bore of the holder for engagement with a limited area of the side wall of a cup seated in the holder. Although greatly exaggerated, it will be seen that any tendency of the holder to shrink or contract due to cooling thereof causes the inner end of the pin 16 to flex the side wall of the cup inwardly over a localized area as seen at 18 in Figure 3, without appreciably interfering with removability of the cup from the holder.

It will also be appreciated that while the inner extremity of the pin 16 engages the cup at an extremely limited area of its side wall, direct contact between the cup and the holder 7 is possible only at a limited area of the holder diametrically opposite the pin 16. Hence, contraction of the holder 7 during mixing of a cold drink in the cup cannot result in a condition where the entire peripheral portion of the cup surrounded by the holder is intimately contacted and gripped by the holder.

It will also be seen that the protuberance or pin 16 cooperates with the wall portions of the bore opposite thereto, to provide in effect a bottom for the holder upon which the cup rests by the fact that engagement of the tapered walls of the cup with said pin and said wall portions of the bore limits the extent to which the cup may be inserted.

From the foregoing description taken in connection with the accompanying drawing, it will be apparent to those skilled in the art that this invention provides a simple yet highly effective expedient for assuring ready removability of the mixer cup of an electric drink mixer of the type wherein the cup is held in place during mixing by an annular metallic holder.

What I claim as my invention is:

1. Means for supporting a drink mixer cup whose side wall tapers slightly toward its small diameter bottom end, comprising: a rigid holder having a bore extending entirely therethrough and tapered to fit the bottom portion of the cup; and a small non-yielding protuberance immovably fixed on the wall defining said tapered bore and engageable with the side of a cup inserted into the holder for preventing the cup from being inserted into the holder to the depth at which its side wall fits the wall of the bore, said protuberance cooperating with wall portions of the bore opposite thereto to provide in effect a bottom for the holder upon which the cup rests, and limiting surface to surface engagement between the holder and the cup to thus prevent thermal freezing of the cup in the holder.

2. A support for a drink mixer cup whose side wall tapers slightly toward its small diameter bottom end, said support comprising: a rigid metal ring having a bore extending axially therethrough and tapered to fit the bottom portion of the cup; and a pin immovably fixed in the wall of the ring with its inner end projecting substantially radially into said bore and engageable with the tapered side wall of a cup inserted into the ring for preventing the cup from being inserted into the bore to the depth at which the side wall of the cup has surface to surface engagement with the entire wall of the bore, said pin cooperating with a small portion of the opposite wall of the bore to support a cup thereon to provide in effect a bottom for the holder upon which the cup rests.

FRITZ VICTOR FORSS.

REFERENCES CITED

The following references are of record in the file of this patent:

UNITED STATES PATENTS

| Number | Name | Date |
| --- | --- | --- |
| 144,070 | Dietz | Oct. 28, 1873 |
| 1,801,835 | Andrews | Apr. 21, 1931 |
| 1,997,873 | Poplawski | Apr. 16, 1935 |
| 2,282,866 | Hagen | May 12, 1942 |